May 16, 1933.  H. B. BROWN  1,909,391

THERMOMETER

Filed July 17, 1930

INVENTOR:
H. Brainard Brown
BY
Alfred Burger
ATTORNEY

Patented May 16, 1933

1,909,391

UNITED STATES PATENT OFFICE

H. BRAINARD BROWN, OF ROCHESTER, NEW YORK, ASSIGNOR TO TAYLOR INSTRUMENTS COMPANIES, OF ROCHESTER, NEW YORK, A CORPORATION OF NEW YORK

THERMOMETER

Application filed July 17, 1920. Serial No. 468,568.

This invention relates to thermometers and more in particular to means for mounting thermometer tubes relatively to the usual scale plates.

In order to fix thermometer tubes against lengthwise movement relatively to the scale, the upper end of the tube is usually provided with a hook for engagement in an indentation or perforation in the scale plate or base. This indentation must be carefully determined and in many instances must be changed or the hook in the stem must be changed in order to establish the proper position of the stem. This relative adjustment is often time-consuming and expensive.

In addition, in cases where the base is of ceramic material or is coated with glass or enamel, the adjustment must be confined to changes in the location of the hook, which adjustment is by far the more expensive.

Also, in some forms of thermometer, as for instance in the form described herein, where the indentation or perforation together with the point of the hook would appear in full view on the front face of the thermometer, the usual arrangement would be out of the question.

It is the object of this invention to provide means for avoiding all of the above mentioned difficulties and to afford a ready adjustment of tubes, irrespective of the character of the base.

In the drawing, which forms a part of the specification,

Figure 1:
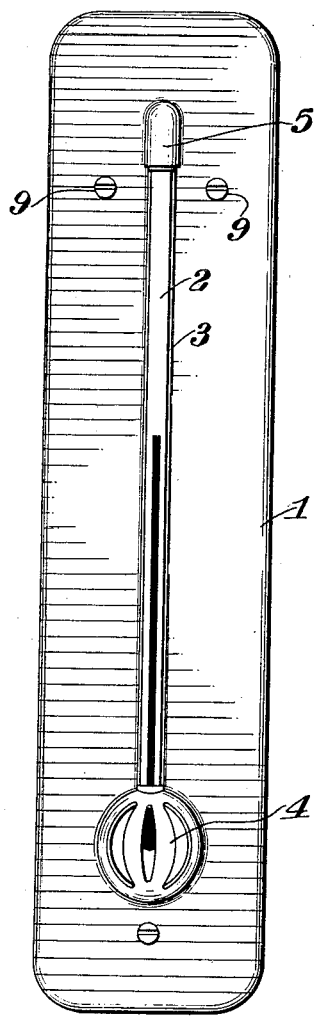
Fig. 1 is a face view of a thermometer embodying the invention.
Figure 2:
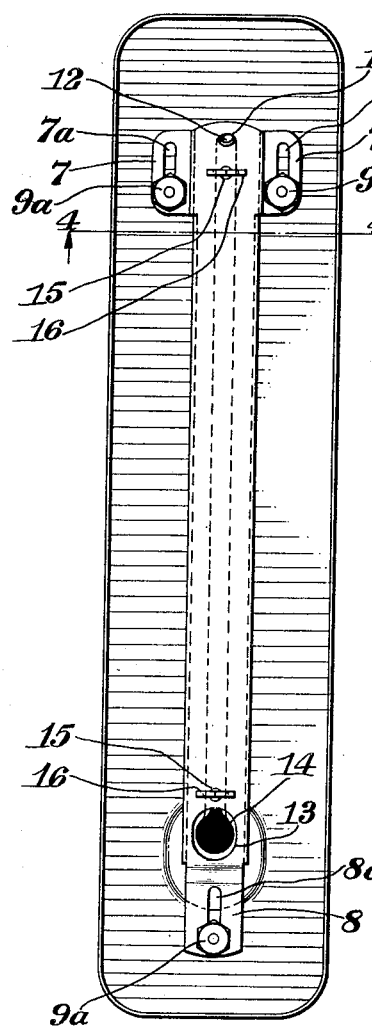
Fig. 2 is rear view thereof.
Figure 3:
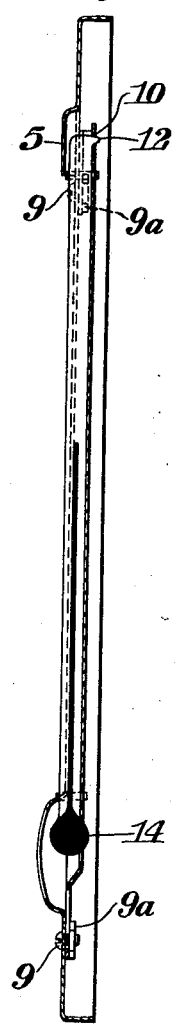
Fig. 3 is a central vertical section.
Figure 4:
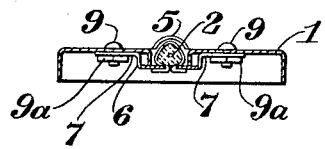
Fig. 4 is a transverse section on line 4—4, Fig. 2.

Having reference to the drawing, the base 1 is of metal preferably provided with a coat of enamel and is formed to define a central opening 3 to receive and expose the thermometer stem 2, a hooded bulb guard 4 and a hooded portion 5 to accommodate the upper end of the stem. It will be noted from Fig. 3 that thermometer stem 2 projects forwardly from the central opening 3 in the base which arrangement insures adequate illumination for this stem.

The invention proper comprises a channel frame 6 provided at its upper and at its lower end with sloted flanges 7 and 8 respectively. In the particular instance the flanges 7 are disposed laterally of the frame 6 while the single flange 8 is a lengthwise extension of the frame 6. On the base 1 are provided screws 9 for cooperation with the slots 7a and 8a respectively of the flanges 7 and 8 and nuts 9a are used to secure the frame 6 on the base.

The frame 6 has near its upper end a perforation 10 to receive the hook 12 at the upper end of the stem 2 and an aperture 13 for accommodating the bulb 14 of the thermometer tube. By means of perforations 15 and straps 16 the thermometer tube is secured to the frame 6. The invention is applied as follows:

According to the length of the thermometer tube to be mounted a frame 6 is selected from a stock of different sizes, such as to receive the hook and the bulb in the perforation 10 and the aperture 13, respectively. The aperture 13, as a rule, is slightly oval to compensate for differences in length, within certain limits. The tube is put in place and the straps 16 are applied in the usual manner to secure the tube in position. Then the frame 6 and the tube are mounted, as a unit, on the rear surface of the base. All that is necessary is to enter the slots 7a and 8a over the screws 9 and provisionally apply the nuts 9a. The frame 6 is then moved until the usual test marks on the thermometer stem coincide with the corresponding points on the scale, when the nuts 9a are screwed tight and preferably locked in place, as for instance by mutilating the thread in the screws 9.

By the arrangement described, the thermometer stem may be finally adjusted in position and when it is in the proper position, a simple tightening of the nuts 9a completes the mounting.

I claim:

1. In a thermometer, the combination of a base having a scale and an opening extending along the scale, terminating at the bottom in an enlargement for accommodating the bulb of a thermometer tube, a thermometer tube disposed in the opening and projecting forwardly therefrom, the bulb being disposed in said enlargement, the tube being bodily movable in the opening and said enlargement, and a frame for supporting the tube, adjustably mounted on the rear face of the base for movement lengthwise of the base.

2. In a thermometer, the combination of a base having a scale and an opening extending along the scale, said base being provided with an integral bulb guard leading to one end of said opening and being provided with an integral projecting hood leading to the other end of said opening, a thermometer tube disposed in the opening having its bulb disposed in said bulb guard and its upper end extending into the projecting hood, and a channel shaped frame for supporting the tube adjustably mounted on the rear face of the base for movement lengthwise of the base, the longitudinal edges of said frame projecting toward said base.

In testimony whereof I affix my signature.

H. BRAINARD BROWN.